United States Patent [19]

Frutschi

[11] Patent Number: 4,466,249
[45] Date of Patent: Aug. 21, 1984

[54] GAS TURBINE SYSTEM FOR GENERATING HIGH-TEMPERATURE PROCESS HEAT

[75] Inventor: Hansulrich Frutschi, Riniken, Switzerland

[73] Assignee: BBC Brown, Boveri & Company, Limited, Baden, Switzerland

[21] Appl. No.: 322,582

[22] Filed: Nov. 18, 1981

[30] Foreign Application Priority Data

Nov. 25, 1980 [CH] Switzerland ............... 8692/80

[51] Int. Cl.³ ............................................. F01K 13/00
[52] U.S. Cl. ....................................... 60/648; 60/655
[58] Field of Search ................................ 60/648, 655

[56] References Cited

U.S. PATENT DOCUMENTS 4,041,709 8/1977 Rajakovics ............................ 60/655

Primary Examiner—Allen M. Ostrager
Attorney, Agent, or Firm—Burns, Doane, Swecker & Mathis

[57] ABSTRACT

The present invention relates to gas turbine systems for generating high-temperature process heat. To simplify the primary circuit and to eliminate the necessity of using the same circulation means for the primary and drive circuits in gas turbine systems, a system of this type is designed so that the medium heated in the secondary part of a heat exchanger is divided into a portion of drive gas for operating the drive circuit and a portion of process gas for the actual generation of process heat in the secondary circuit. After the process heat has been given off in a process-heat consumer part, the process gas is then expanded in an expansion turbine and thereafter recycled to the drive circuit. Thereupon, the combined drive gas and process gas, which is compressed in at least one compressor located in the drive circuit, is preheated in a recuperator. The expansion turbine drives, in addition to at least one process-gas compressor, a generator, the electrical energy of the generator being used to operate a recycle blower in the primary circuit.

4 Claims, 3 Drawing Figures

GAS TURBINE SYSTEM FOR GENERATING HIGH-TEMPERATURE PROCESS HEAT

BACKGROUND AND SUMMARY OF THE PRESENT INVENTION

The present invention relates generally to a gas turbine system for generating high-temperature process heat. More specifically, the present invention relates to a gas turbine system for coal gasification, in which at least one primary circuit having a heat source, a heat exchanger and a recycle blower, is connected via the heat exchanger to a secondary circuit having at least one process-gas compressor, at least one process-heat exchanger and an expansion turbine. The system also includes a drive circuit with a gas turbine, at least one cooler and a compressor.

For the endothermic conversion of coal into synthetic gas, nuclear energy can be used, in an advantageous way, as a supply source for process heat. However, a gas, preferably helium, serving as the reactor coolant of a high-temperature reactor cannot be used directly, although a temperature level of approximately 950° C. is viewed as an aim in the development of reactors of this type. To meet the requirements for safety and for isolation of the process-heat part of such a system, especially with regard to radioactive contamination, a heat exchanger would have to be provided. Heat exchangers which meet the high safety requirements demanded cannot be made for such high temperatures, in the present state of the art, primarily because of metallurgical problems.

Also, the helium which flows out of the process-heat part of the system and which still has a temperature of approximately 750° C. could not serve as the reactor coolant. To achieve a realistic temperature for the individual structural parts and for the control and shutdown rods, the helium would therefore have to be cooled further, to 300°–400° C.

A gas turbine system of the type mentioned above is known from German Offenlegungsschrift No. 2,826,315. In the circuit shown in FIG. 6 of the Offenlegungsschrift, the cooling-gas temperature at the outflow from the reactor is so low that the gas can be conveyed without previous expansion into the heat exchanger of the primary circuit. Since mechanical energy is required to drive the circulating pump in the primary circuit and the process-gas compressor in the secondary circuit, a special drive ciruit in the form of a gas turbine system is integrated within the primary circuit. This gas turbine system has a turbine, a compressor, a generator and a cooler and is dimensioned so that its output covers the energy requirement for the turbo-machines of the primary and secondary circuits.

Such a system, however, has some serious disadvantages. In the first place, all the machines and apparatus of the drive circuit mentioned are located in the nuclear circuit, thus making it difficult to house and maintain them. Furthermore, all the useful energy has to be generated electrically and then reconverted mechanically, which involves losses and also necessitates large electrical machines. Moreover, mixing losses occur when the drive circuit is brought into the primary circuit. Finally, thermodynamic losses are unavoidable because the expansion turbine in the secondary circuit can have only a low pressure ratio owing to the high inflow temperature of the process gas on the secondary side on entry into the heat exchanger.

One primary object of the present invention is, therefore, to simplify the primary circuit and thus to avoid the necessity of having the same circulation means for the primary circuit and for the drive circuit.

In a gas turbine system of the type mentioned in the introduction, this is achieved, according to the present invention, by a combination of the following features:

(a) immediately downstream of the heat exchanger, the medium heated in the secondary part of the latter is divided into a portion of drive gas for operating the drive circuit and a portion of process gas for the actual generation of process heat in the secondary circuit;

(b) after the process heat generated in the process-gas compressor has been given off in the process-heat consumer part and then expanded in the expansion turbine, the process gas is introduced into the drive circuit at a junction having at least approximately the same thermodynamic state;

(c) the combined drive gas and process gas, compressed in the compressor of the drive circuit, is preheated in a recuperator before entry into the secondary part of the heat exchanger;

(d) the expansion turbine in the secondary circuit drives, in addition to the process-gas compressor, a generator which generates the electrical energy required to drive the recycle blower.

One advantage of the present invention is to be seen in the fact that, in addition to the free choice of the heat source, not only gas cooling, but also metal cooling, for example by means of liquid unpressurized sodium, can be employed for cooling the heat source. Furthermore, many degrees of freedom are available for the introduction of the expanded process gas into the drive circuit.

It is also advantageous if the expanded process gas gives off part of its residual heat in an aftercooler or in the recuperator before it is combined with the drive gas.

According to a further embodiment of the gas turbine system according to the present invention, the mass flow of the drive gas is calculated so that the gas turbine subjected to it supplies only the power required to drive the compressor generating the circuit pressure.

BRIEF DESCRIPTION OF THE DRAWINGS

Preferred embodiments of the system according to the present invention are described with reference to the accompanying drawings wherein like members bear like reference numerals and wherein.

DETAILED DESCRIPTION OF THE PREFERRED EMBODIMENTS

For a better understanding, the gas turbine system of the present invention is explained through the use of a numerical example. A system is assumed in which mass flows of 1,000 kg/s of cooling gas and process gas circulate in the primary circuit and in the secondary circuit, respectively, and both are under a pressure of 40 bars during heat exchange.

Figure 1:
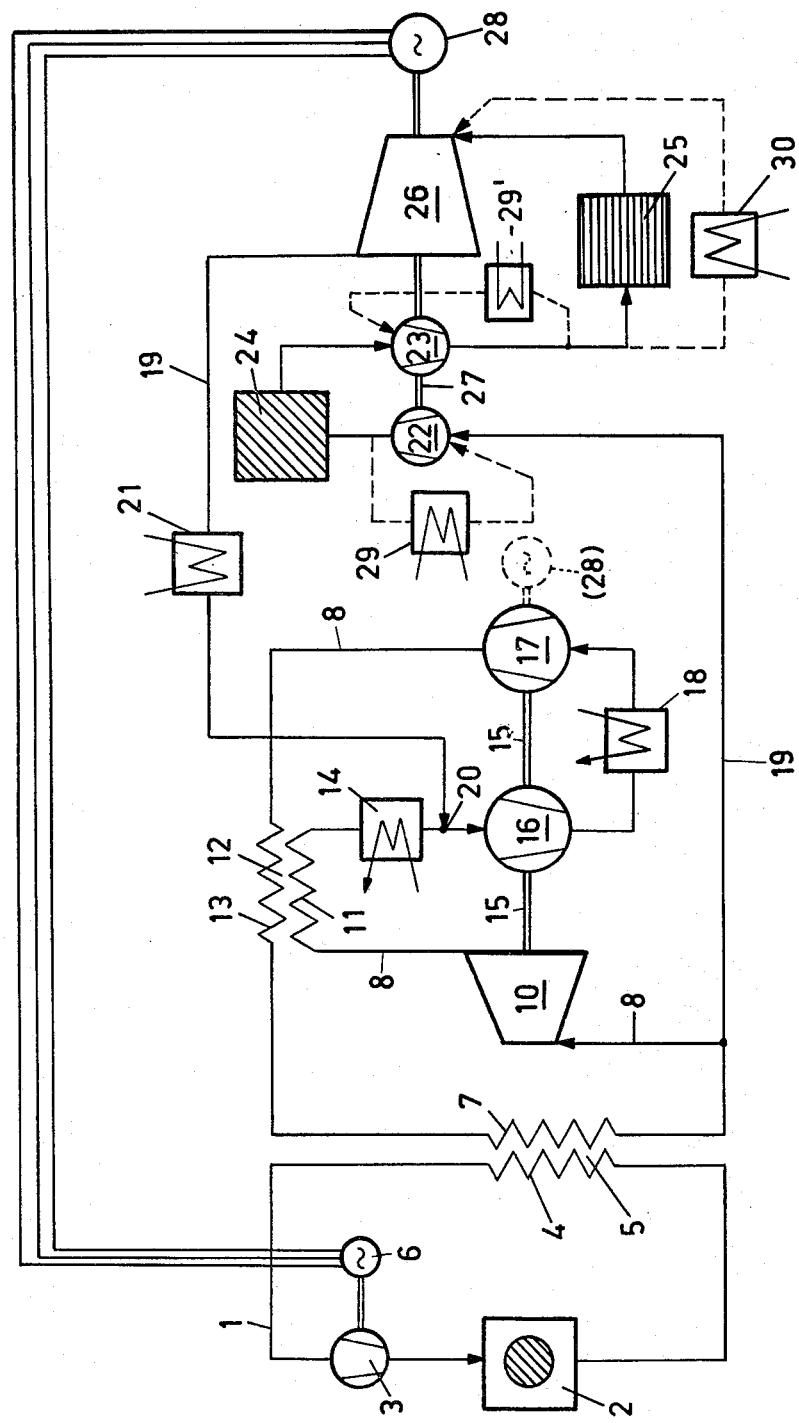
FIG. 1 is a schematic view of a gas turbine system according to a first preferred embodiment of the present invention.

With reference to FIG. 1, a preferred embodiment of a system according to the present invention includes a helium-cooled reactor with a thermal output of approximately 2,140 MW located as a heat source 2 in a primary circuit 1. The cooling gas conveyed by a recycle blower 3, driven by an electrical machine 6, flows at a temperature of approximately 800° C. into a primary part 4 of a heat exchanger 5, gives off its heat in the latter and leaves it at approximately 370° C. The energy required to convey the quantity of cooling gas amounts to approximately 90 MW.

The process gas is heated to approximately 760° C. in a secondary part 7 of the heat exchanger 5. According to the present state of the art, there are neither metallurgical nor constructional problems in the manufacture of such a heat exchanger.

Only a little more than 40% of the medium flowing through the heat exchanger is used in a secondary circuit 19 for generating the process heat. This partial flow is compressed twice in succession by two compressors 22, 23 to the temperature of approximately 950° C. required in two process-heat consumers 24, 25. It goes without saying that the temperatures before and after the two consumers 24, 25 can, in a given case, be either equal to each other or of different values, as desired.

The process gas thus compressed in two stages to approximately 85 bars is subsequently expanded, after giving off the actual process heat, in an expansion turbine 26. The energy obtained as a result is used to drive the two compressors 22, 23.

A plurality of coolers 29, 29', 30 are provided for the necessary cooling of the rotating machines in the process circuit 19. Immediately downstream of each of the two compressors 22, 23, approximately 3% of the quantity of compressed gas is extracted from the main flow, in each case, and, after being cooled to approximately 250° C., is returned to the compressors for cooling purposes. A 2% extraction, which is also cooled down to approximately 250° C. in the cooler 30, is sufficient, in this respect, for the expansion turbine 26.

These cooling-gas flows are a fairly important factor in the thermodynamic calculation of the system as a whole and must be taken into account together with the pressure losses occurring in the circuit and the polytropic machine efficiencies. Thus, in the example shown, approximately 120 MW of process steam with a pressure of 50 bars can be obtained with the heat occurring in the coolers 29, 29', 30. The consumers 24, 25 can consume approximately 870 MW of actual high-pressure high-temperature heat.

Apart from the above mentioned quantities given for the process medium, gas turbine systems of this type for generating process heat are so far known.

However, according to the present invention, the process gas is now expanded to a very low pressure, for example to approximately 13 bars, in the expansion turbine 26. During this time, sufficient energy is obtained to generate, in a generator 28, that electrical energy which is required for the drive 6 of the recycle blower 3 located in the primary circuit 1. The process gas, now expanded to the lowest circuit pressure must, again, be brought to the state required for heat exchange and for the conditions of entry to the first process-gas compressor 22.

This is carried out, according to the present invention, through the use of a drive circuit 8 which is superimposed as a drive source on the secondary or process circuit 19. Somewhat less tht 60% of the total medium heated on the secondary side 7 in the heat exchanger 5 is used to build up the initial circuit pressure of 40 bars.

This partial quantity separated from the actual process gas is expanded in a gas turbine 10, with mechanical power transmitted to a shaft 15. The remaining waste heat of approximately 420° C. in the turbine is used for pre-heating the medium flowing through the secondary side 7 of the heat exchanger 5. Via a primary flow path 11 of a recuperator 12, the waste gas of the turbine gives off a further part of its heat to a secondary flow path 13 of this recuperator and then flows at approximately 150° C. into a pre-cooler 14 in which it is cooled to the lowest temperature possible.

In terms of pressure, a point 20 behind the precooler 14 is suitable for combining the actural process gas with the drive gas. To prevent mixing losses, the process gas, which still has a temperature of approximately 260° C. after its expansion, must, for this purpose, also be re-cooled to as low a temperature as possible in an after-cooler 21.

The combined gas flow is now brought to the circuit pressure of 40 bars by the use of two compressors 16 and 17 located on a turbine shaft of the gas turbine 10, with an intermediate cooler 18 provided between them.

It goes without saying that the heat occuring in the pre-cooler 14, the intermediate cooler 18 and the after-cooler 21 can also be used. In this case, according to the example described, if heat for district heating is produced, approximately 800 MW of heat for district heating at 120/50° C. can be utilized.

This gives a total utilization of 870 MW of high-temperature heat plus 800 MW of heat for district heating plus 120 MW of process steam at 50 bars = 1,790 MW, which corresponds to more than 80% of the reactor thermal output of 2,140 MW.

Figure 2:
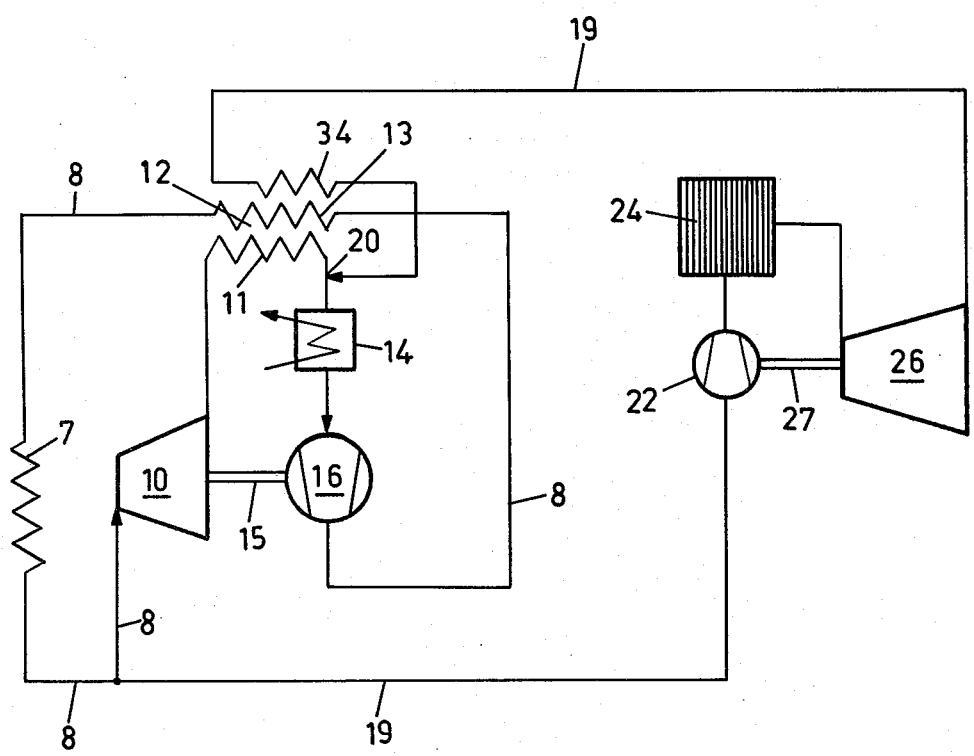
FIG. 2 is a schematic view of a simplified circuit arrangement for a relatively low process temperature according to a second preferred embodiment of the present invention.

With reference now to FIG. 2, a second preferred embodiment according to the present invention includes a conventional heat source instead of a nuclear reactor. Since, in this case, the gas temperatures occurring are assumed to be substantially lower, only one compressor 16, 22 is provided in the drive circuit 8 and in the secondary circuit 19, respectively, and only one process-heat consumer 24 is provided.

If no low-pressure process steam is to be generated, a further flow part 34 of the recuperator 12 can take the place of the aftercooler 21 (see FIG. 1). It is also possible to provide two recuperators (not illustrated) in the circuit instead of one recuperator 12. In this arrangement, the primary flow part 11 of the first recuperator works as a primary part and the gas of the drive circuit 8 flows through the secondary part 13 of the first recuperator. In the second recuperator, the flow part 34 serves as a primary part and the gas of the secondary circuit 19 flows through the secondary part. The available process heat can thus be increased.

Figure 3:
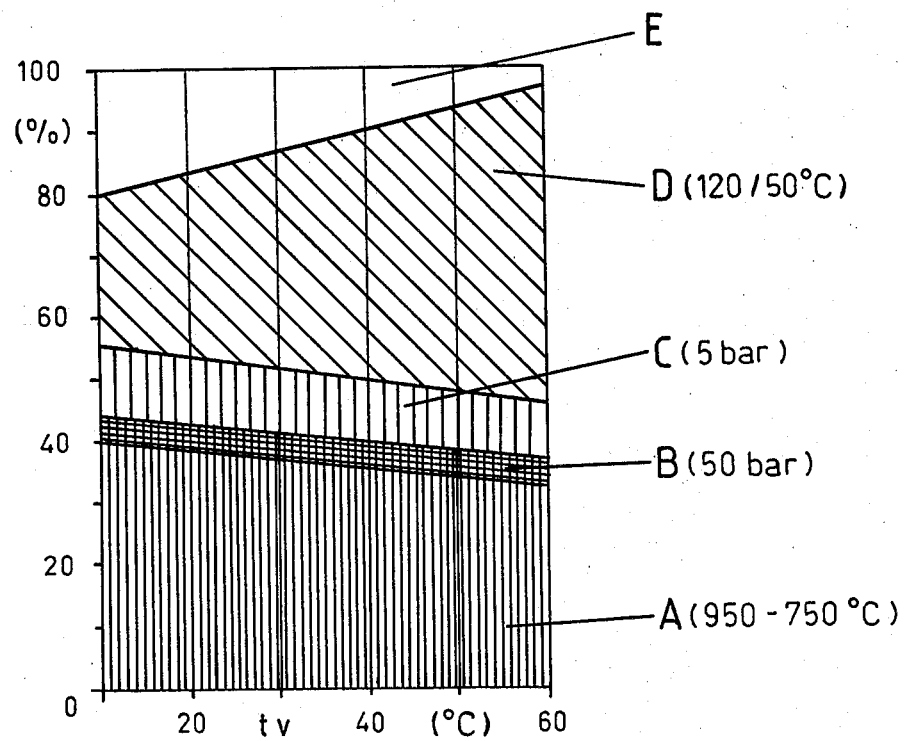
FIG. 3 is a graphical representation of an energy balance of the gas turbine system of FIG. 1.

For the circuit arrangement of FIG. 1, in which an expansion ration of 3:1 has been assumed for the gas turbine 10 and in which the conventional circuit-pressure losses and turbine efficiencies are taken as a basis, the energy balance illustrated if FIG. 3 is obtained, with a variable gas inflow temperature into the two compressors 16, 17 located on the gas turbine shaft. The compressor inflow temperature $t_v$ are plotted in (°C.) on the abscissa and the energy in (%) on the ordinate. With cooling to as low a temperature as possible, approximately 10° C., approximately 40% high-temperature process heat A at 950°-750° C. approximately 5% high-pressure (process) steam B 50 bars, approximately 10% low-pressure (process) steam C at 5 bars and approximately 25% (district-heating) heat D at 110°/50° C. occur, and the losses E amount to approximately 20%. A total utilization of the reactor thermal output of approximately 80% is achieved. The precentage figures vary as a function of the compressor inflow temperatures. However, if for example a district-heating network represents the only heat sink, then the portions of process heat A and heating heat D vary substantially, specifically to approximately 32% process heat A of 950/750° C. and approximately 50% (district-heating) heat D. Utilization of the reactor energy then amounts to approximately 95%.

The starting operation for the system can be carried out, in a known way, by an electrical machine (not illustrated) acting on the gas turbine 10. For adapting the secondary circuit to the process-heat output required at a given time, the measures known for controlling gas turbines with a closed circuit can also be provided. For example, the filling quantity of gas in the secondary circuit 19, and compressor reflux in the drive circuit 8 may be varied. Whereas in the first case, the thermodynamic ratios for the entire power range remain the same, the second method, that is to say compressor reflux in the drive circuit 8, causes a reduction in the machine speeds and a corresponding decrease in the pressure ratios.

The invention is, of course, not restricted to the exemplary embodiments described. Thus, other gases, such as nitrogen or carbon dioxide, can of course be used instead of helium as the circulation gas. A liquid coolant, for example a salt or a metal, could also be used in the primary circuit 1.

As distinct from the arrangement of the generator 28 described above with reference for FIG. 1, the generator 28 could alternatively be driven by the gas turbine 10 of the drive circuit 8 (shown by broken lines in FIG. 1).

It goes without saying that the expansion ratio of the two gas turbines and the number of compressors and intermediate coolers can also be varied.

Circuit arrangements in which a parallel connection of two gas turbine systems connected to one another on the gas side, one system building up, by means of the reactor output, a pressure gradient which, in turn, drives the other system intended as a heat pump, are encompassed by the present invention.

The principles, preferred embodiments and modes of operation of the present invention have been described in the foregoing specification. The invention which is intended to be protected herein should not, however, be construed as limited to the particular forms disclosed, since these are to be regarded as illustrative rather than restrictive. Variations and changes may be made by those skilled in the art without departing from the spirit of the present invention.

What is claimed is:

1. In a gas turbine system for generating high-temperature process heat, the system comprising at least one primary circuit including a heat source, a primary part of a heat exchanger and a recycle blower, a secondary circuit including a secondary part of the heat exchanger in heat exchange relationship with the primary part in the primary circuit, the secondary circuit including at least one process-gas compressor, at least one process-heat exchanger and an expansion turbine, and a drive circuit connected to the secondary circuit and including a gas turbine, at least one cooler and at least one compressor;

a first junction in the secondary circuit located immediately downstream of the secondary part of the heat exchanger, the medium heated in the secondary part of the heat exchanger being divided at the first junction into a portion of drive gas for passage through the entire drive circuit and a portion of process gas for the actual genertion of process heat in the secondary circuit;

a second junction at which the process gas is combined with the drive gas, the process gas being combined with the drive gas after the process heat generated in the at least one process-gas compressor has been given off in the at least one process-heat exchanger and the process gas has been expanded in the expansion turbine, the process gas having approximately the same thermodynamic state as the drive gas in the drive circuit at the second junction;

the combined drive gas and process gas being compressed in the at least one compressor of the drive circuit, the combined drive gas and process gas being preheated in a recuperator after being compressed and before entry into the secondary part of the heat exchanger; and a generator for generating electrical energy to drive the recycle blower, said generator being driven by the expansion turbine in the secondary circuit , the expansion turbine also driving the at least one process-gas compressor.

2. The gas turbine system of claim 1, wherein the expanded process gas gives off part of its residual heat in an aftercooler before the process gas is combined with the drive gas.

3. The gas turbine system of claim 1, wherein the mass flow of the drive gas in the gas turbine is sufficient to supply only the power required to drive the at least one compressor for generating the circuit pressure.

4. The gas turbine system of claim 1, wherein the expanded process gas gives off part of its residual heat in the recuperator before the process gas is combined with the drive gas.

* * * * *